United States Patent [19]
Ahrens, Jr. et al.

[11] Patent Number: 5,790,431
[45] Date of Patent: Aug. 4, 1998

[54] METHOD AND SYSTEM FOR MEASURING AVAILABILITY IN A DISTRIBUTED NETWORK

[75] Inventors: George Henry Ahrens, Jr., Pflugerville; Arun Chandra, Austin, both of Tex.; Conrad William Schneiker, Tucson, Ariz.

[73] Assignee: International Business Machines Corporation, Armonk, N.Y.

[21] Appl. No.: 560,918

[22] Filed: Nov. 20, 1995

[51] Int. Cl.⁶ ..................................................... G04F 7/00
[52] U.S. Cl. ...................... 364/569; 395/200.56; 395/674
[58] Field of Search ........................ 364/468.05, 468.08, 364/514 R, 514 L, 569, 550, 551.01; 395/182.02, 200.01, 200.02, 200.03, 200.06, 200.1, 200.11, 200.2, 180, 672–675, 200.54, 200.55, 200.56

[56] References Cited

U.S. PATENT DOCUMENTS

| | | | |
|---|---|---|---|
| 4,800,488 | 1/1989 | Agrawal et al. | 364/200 |
| 5,089,958 | 2/1992 | Horton et al. | |
| 5,123,017 | 6/1992 | Simpkins et al. | |
| 5,317,568 | 5/1994 | Bixby et al. | |
| 5,345,584 | 9/1994 | Hill | |
| 5,414,845 | 5/1995 | Behm et al. | 395/650 |
| 5,471,622 | 11/1995 | Eadline | 395/375 |
| 5,548,722 | 8/1996 | Jalalian et al. | 395/200.1 |

OTHER PUBLICATIONS

IBM TDB, "Distributed Transaction Commit Protocols For Highly Available Systems", vol. 26, No. 8, Jan. 1984, pp. 4250–4251.

IBM TDB, "Monitoring System For Reliability, Accessability and Serviceability", vol. 37, No. 09, Sep. 1994.

*Primary Examiner*—James P. Trammell
*Attorney, Agent, or Firm*—Richard A. Henkler

[57] ABSTRACT

A method and apparatus for determining the availability of a workstation in a distributed network. Availability is determined using an Availability Measurement System having a Downtime unit, an Availability Disable unit, and a Calculation unit. During the initialization of the workstation, a heartbeat monitor daemon is created to store, at predetermined time intervals, timestamps of the network. Once the workstation becomes unavailable, the recording of the timestamps ceases, thus, allowing an accurate representation of when the workstation became unavailable. Upon the return of the workstation to the status of available, the Downtime unit reads the current time of the network and the stored timestamp to calculate the duration of the unavailability of the workstation. The duration is then stored for later calculation of availability of the workstation for a defined interval of time using the Calculation unit. The Availability Measurement System may be disabled using the Availability Disable unit, thus, allowing selected durations of unavailability to be excluded from an availability calculation.

15 Claims, 5 Drawing Sheets

METHOD AND SYSTEM FOR MEASURING AVAILABILITY IN A DISTRIBUTED NETWORK

A portion of the disclosure of this patent document contains material which is subject to copyright. The copyright owner has no objection to the facsimile reproduction by any one of the patent disclosure, as it appears in the Patent and Trademark Office patent files or records, but otherwise reserves all copyright rights whatsoever.

BACKGROUND

1. Field of the Present Invention

The present invention generally relates to distributed networks, and more specifically to methods and systems for measuring availability of a Workstation in a distributed network.

2. History of Related Art

The use of Workstations in a distributed network has rapidly evolved from antedated single-user applications to more sophisticated multi-user business critical server-type applications, such as Corporate Servers, Reservation Systems, Banking Systems, and Manufacturing Control Systems. As a result of the evolution, many performance measurement tools have been developed for the Workstation. These performance measurement tools have allowed developers and performance analysts to tune the distributed networks for high performance related activities, such as load balancing and monitoring network problems.

Although the introduction of the performance measurement tools has advanced the evolution, far more effort is needed. For instance, the computer industry has consistently failed to take into consideration the availability of the Workstation. This is especially true when considering the execution of business critical server-type applications. Availability, as referred to hereinafter, refers to the period of time in which a particular workstation was available over the course of its operability. The consideration of availability during execution of a business critical server-type application is crucial, since it gives an indication of the dependability of the workstation to perform the critical tasks of the application. A workstation which has low dependability should be flagged and configured out of the network.

In yet a further example, the computer industry has failed to consider the availability of Workstations during job (application) scheduling. Job scheduling typically involves the distribution of the processing requirements for a job among selected Workstations of a network. The distribution is performed in a manner that results in distributing the processing requirements evenly among the selected Workstations. The exclusion of an availability analysis from job scheduling considerations can result in inefficiencies from bottle necking, and even worse deadlocks.

Maintenance scheduling can arise from many different factors, in example, scheduled warranty visits, and estimated time periods in which a particular machine requires various maintenance checks. Unfortunately, the current methods and systems for implementing maintenance scheduling for an network fail to consider the availability of the various Workstations. In general, maintenance scheduling is usually performed on an estimated time schedule or on a user reported basis. Thus, unreliable equipment may fail to be serviced from either a failure to report a particular problem or for failing to fall within the estimated time schedule. This can unnecessarily result in inefficiencies for such scheduling. For example, assume that a particular Workstation has been unavailable several times due to software and/or hardware problems, such that it should be considered unreliable. These problems may have been unnoticed due to several factors such as, the period of time at which the Workstation became unavailable, or failure of person(s) responsible for the Workstation to report the problems.

It would, therefore, be a distinct advantage to have a method and system that would track the availability of each workstation in a network, and which would schedule maintenance and jobs for workstations based upon the availability of the workstations. The present invention provides such a method and system.

SUMMARY OF THE PRESENT INVENTION

The present invention allows the availability of a Workstation to be taken into consideration when scheduling jobs and maintenance requirements in a distributed network.

In one aspect, the present invention is a method of determining the availability of a Workstation in a distributed network. The method includes the step of storing the duration of each interval of time in which the Workstation becomes unavailable. The method further includes the step of calculating the availability of the Workstation for a defined period of time using the stored durations.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

In the following description, numerous specific details are set forth to provide a thorough understanding of the present invention. However, it will be obvious to those skilled in the art that the present invention may be practiced without such specific details.

Figure 1:
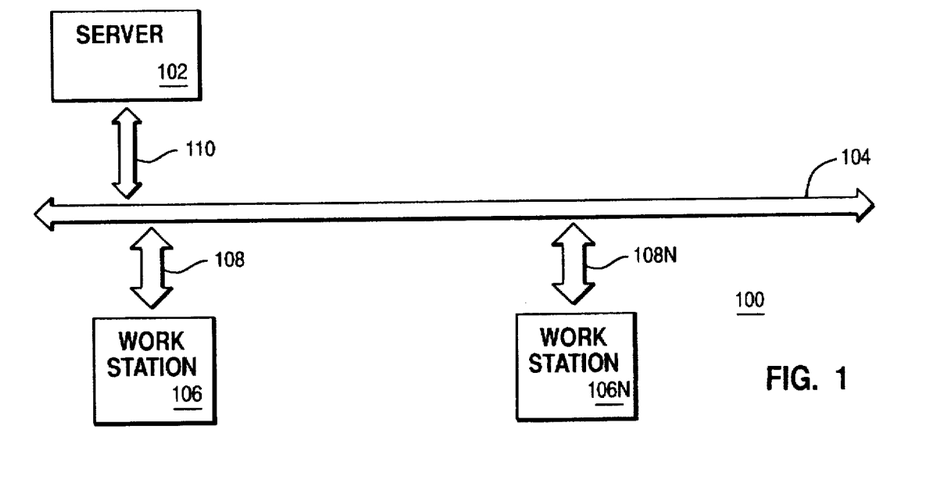
FIG. 1 is a block diagram illustrating a distributed network 100 in which the present invention can be practiced.

Reference now being made to FIG. 1, a block diagram is shown illustrating a distributed network 100 in which the present invention c,an be practiced. The distributed network 100 includes a server 102, a plurality of Workstation (clients) 106–106n, and communication means such as Token Ring, or Ethernet 104 for providing communication between the server 102 and the Workstations 106–106n. The server 102, and each one of the Workstations 106–106n are connected to the communication means 104 via bi-lateral connections 110, and 108–108n, respectively. In the preferred embodiment of the present invention, all of the Workstations 106–106n and the server 102 are operating under the AIX [TM] operating system (not shown) produced by the International Business Machines Corporation.

Figure 2:
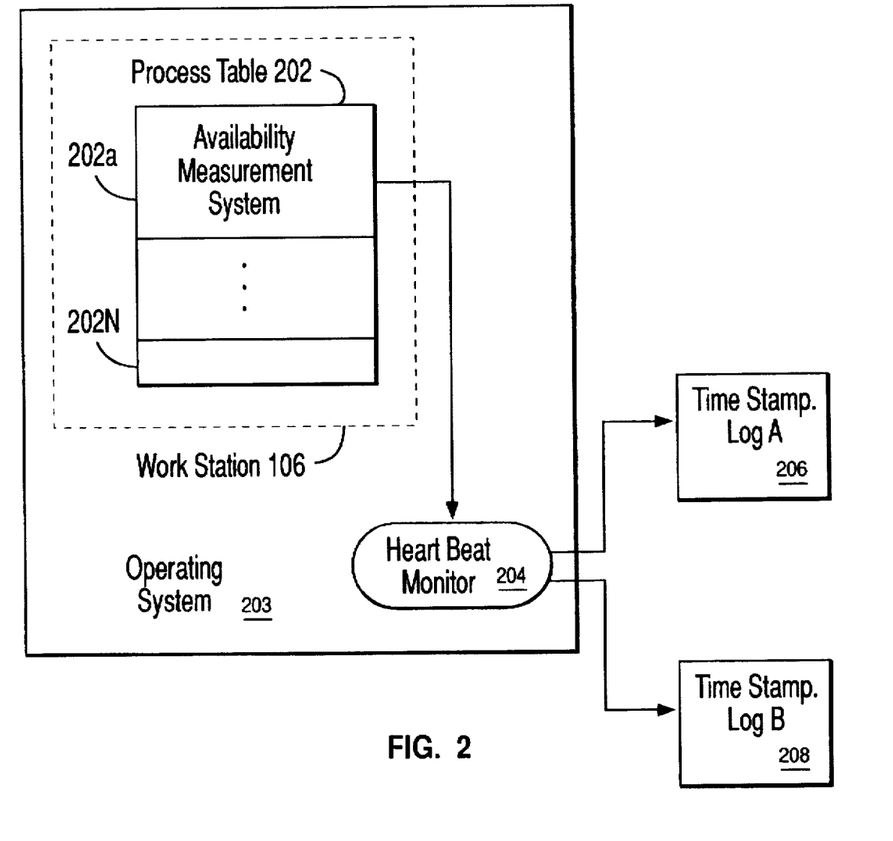
FIG. 2 is a block diagram illustrating various components of the operating system 203 of FIG. 1 according to the teachings of the present invention.

Reference now being made to FIG. 2, a block diagram is shown illustrating various components of the operating system 203 of FIG. 1 according to the teachings of the present invention. The operating system 203 includes process tables for each of the Workstations 106–106n, however, only Process Table 202 for Workstation 106 is shown and discussed since the other process tables are equivalent. The Process Table 202 is used for indicating to the operating system 203 the programs, which may include daemons and/or applications, that must be started upon initialization or ReBoot of the Workstation 106. The programs are identified by a corresponding entry 202a–202n in the Process Table 202. In this particular example, entry 202a contains an identification of an Availability Measurement System. The identification may be, for example, a pointer or other means for invoking the identified program and/or daemon.

Figure 3:
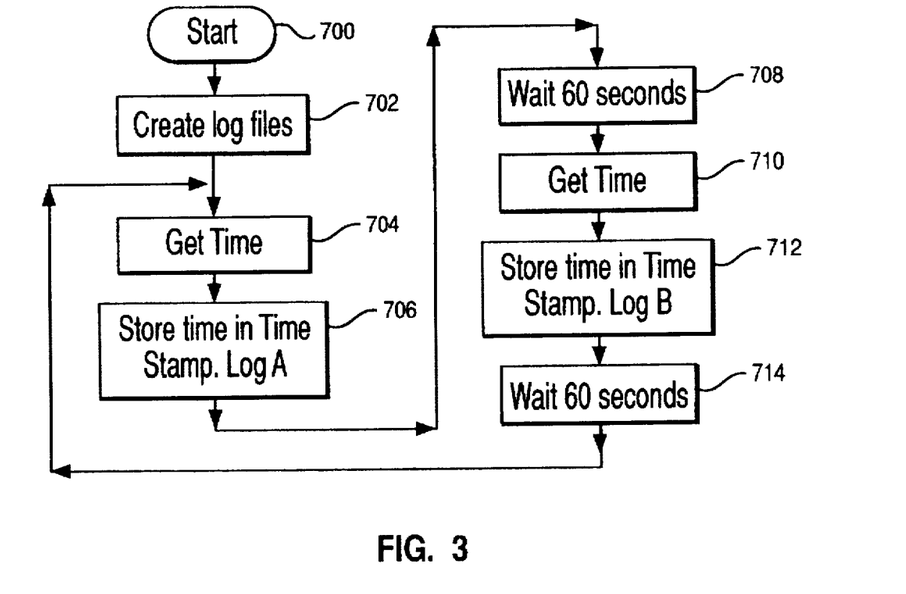
FIG. 3 is a flow chart illustrating the steps comprising the execution of the Heart Beat Monitor 204 of FIG. 2 according to the teachings of the present invention.

Assuming that the operating system 203 has been initialized, the executed Heart Beat Monitor daemon ("Heart Beat Monitor") 204 is shown and identified by designation 204. Reference now being made to FIG. 3, a flow chart is shown illustrating the steps comprising the execution of the Heart Beat Monitor 204 of FIG. 2 according to the teachings of the present invention. The execution begins at step 700 with the creation of two log files Time Stamp.LogA 206 (FIG. 2) and Time Stamp.LogB 208 (FIG. 2). The execution then proceeds to step 704 where the current time is retrieved from the operating system 203 (FIG. 2). The execution then proceeds to step 706 where the retrieved time is stored in an entry of file Time Stamp.LogA 206. Thereafter, the execution proceeds to step 708 where the execution is delayed for an arbitrary period of time. In the preferred embodiment, the period of time is one minute or 60 seconds.

After the expiration of 60 seconds, the execution proceeds to step 710 where the current time is retrieved from the operating system 203. Thereafter, the execution proceeds to step 712 where the retrieved time is stored in an entry of file TimeStamp.Log B 208. The execution then proceeds to step 714 where the execution is delayed again for an arbitrary period of time (60 seconds). After the expiration of 60 seconds, the execution proceeds back to step 704 and repeats the above note process from that point.

An example of a pseudo code listing of the Heart Beat Monitor 204 is provided below in Table 1.

TABLE 1

```
While True
{
    Get Time;
    If Context Flag == A
```

TABLE 1-continued

```
    {
        Store Time (TimeStamp. Log A);
        Context flag = B;
    }
    Else {
        Store Time (TimeStamp.Log B);
        Contextflag = A;
    }
    Sleep (60);
    End While
}
```

© Copyright 1994 International Business Machines Corporation

It should be noted that file TimeStamp.LogB 208 is an offset (delayed by the arbitrary period (60 seconds)) of file TimeStamp.LogA 206 to ensure data integrity of the time stored by the Heart Beat Monitor 204. The data integrity of a file may be compromised during an interruption of the system, such as a failure or shut down, during a write operation to the file. Accordingly, the present invention can use either or both of the TimeStamp.LogA 206 or TimeStamp.LogB 208 files, provided they contain valid data. The use of the TimeStamp.LogA 206 and TimeStamp.LogB 208 files by the present invention is discussed hereinafter.

Figure 4:
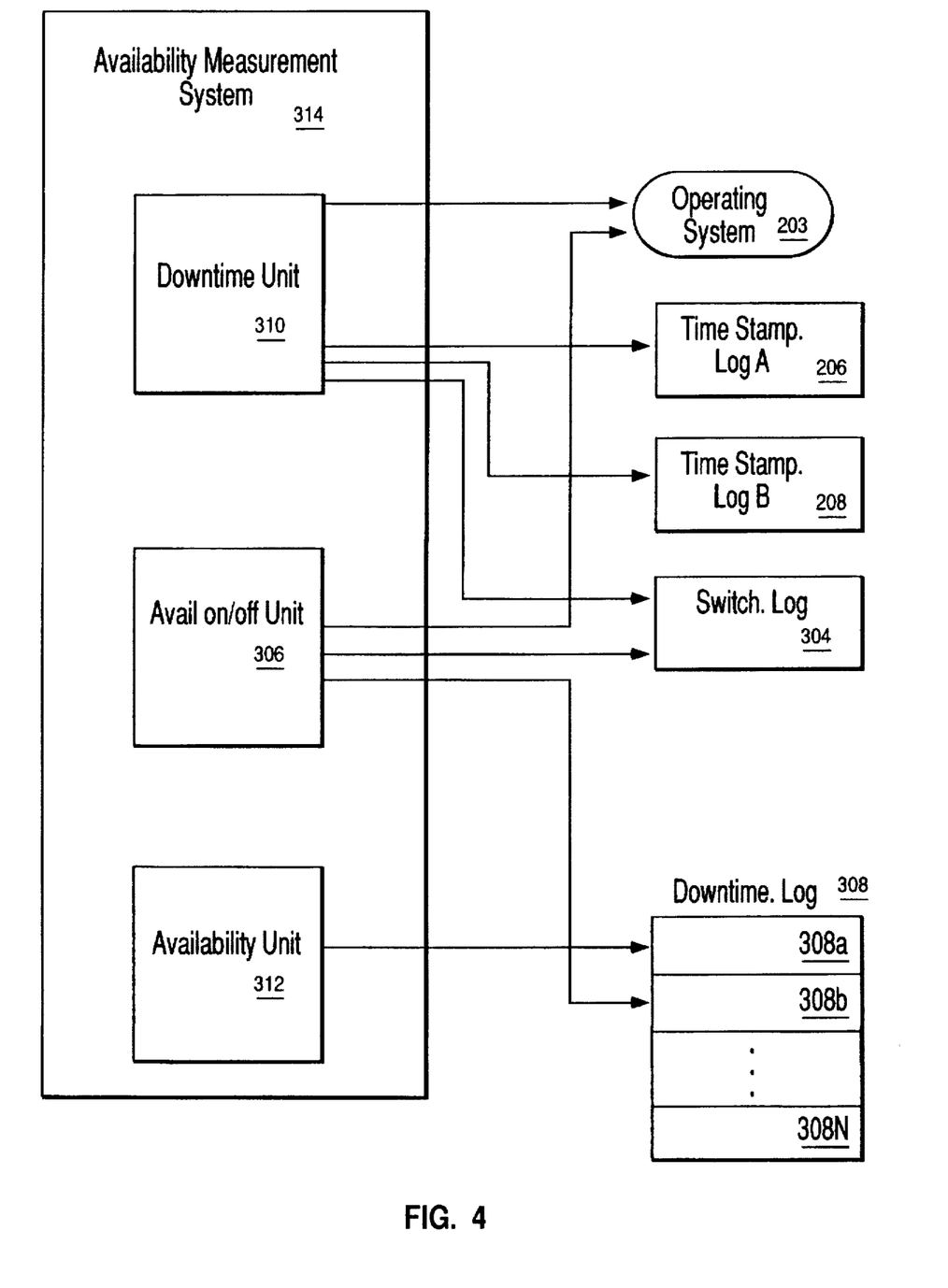
FIG. 4 is a block diagram illustrating an Availability Measurement System 314 for determining the availability of one of the Workstations 106–106n according to the teachings of the present invention.

Reference now being made to FIG. 4, a block diagram is shown illustrating an Availability Measurement System 314 for determining the availability of one of the Workstations 106–106n according to the teachings of the present invention. In the preferred embodiment of the present invention, each one of the Workstations 106–106n has an Availability Measurement System 314. In this particular instance, Availability Measurement System 314 is assumed to be present within Workstation 106.

The Availability Measurement System 314 includes a Downtime Unit 310, an Avail On/Off Unit 306, and an Availability Unit 312. The Availability Measurement System 314 is invoked/created each time the Workstation 106 reboots from a failure or some other condition of unavailability occurs. The Downtime Unit 310 receives information from the operating system 203, either TimeStamp.LogA 206 or TimeStamp.LogB 208, and Switch.Log 304. Downtime unit 310 uses this information to calculate any duration of time in which the Workstation 106 is unavailable, and the cause of the unavailability.

This information is then stored in the Downtime.Log A 308 file and later used by the Availability Unit 312 to calculate the availability of the Workstation 106. The Avail On/Off Unit 306 provides a means for turning the Availability Measurement System 314 on or off. The Availability Unit 312 parses the Downtime.Log 308 file to provide information to the user and/or Server 102 (FIG. 1) concerning the availability of the Workstation 106. A more detailed description of the above noted components and their related functions in calculating the availability of the Workstation 106 is enumerated below.

Figure 5:
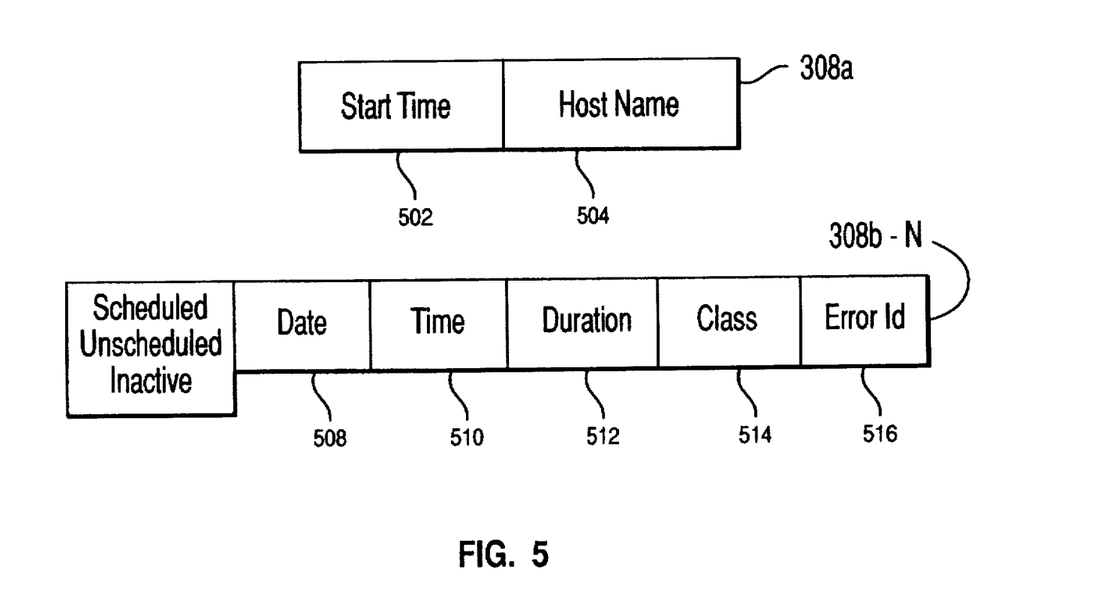
FIG. 5 is a block diagram illustrating in greater detail the various components of the Downtime.Log 308 file of FIG. 4 according to the teachings of the present invention.

The Downtime.Log 308 file includes a header entry 308a and entries 308b–308n. Reference now being made to FIG. 5, a block diagram is shown illustrating in greater detail the various components of the Downtime.Log 308 file of FIG. 4 according to the teachings of the present invention. The header entry 308a contains a start time 502 and a host name 504 which are updated each time the Availability Measurement System 314 is initialized or reset. Each of the entries 308b–n have the following fields: Scheduled/Unscheduled/Inactive 506, Date 508, Time 510, Duration 512, Class 514, and ErrorId 516.

The scheduled/unscheduled/inactive field 506 is used for indicating whether the data stored in this entry resulted from unavailability which was scheduled, unscheduled, or inactivity of the Availability Measurement System 314. The date field 508 is used for recording the date at which the unavailability occurred. The Time field 510 is used for indicating the time at which the unavailability was recorded. The Duration field 512 indicates the duration of the unavailability. The Class field 514 indicates the type of error that created the unavailability, such as software, hardware, or other. The ErrorID field 516 indicates the specific code for the error.

Referring back to FIG. 4, the Avail On/Off Unit 306 allows the user to exclude certain time periods from the calculation of the overall availability of the Workstation 106. This typically occurs during scheduled activities which require the Workstation 106 to be down (turned off), or during periods of time in which the Workstation is executing, but the availability should not be taken into account. The invocation of the Avail On/Off Unit 306 with an indication that the Availability Measurement System 314 is to be turned off results in the storing of the current time of the workstation 106 in the Switch.Log 304 file. The invocation of the Avail On/Off Unit 306 with an indication that the Availability Measurement System 314 is to be turned on results in the storing of a value other than a valid time in the Switch.Log 304 file. In the case of the latter, the Avail On/Off Unit 306 calculates the total time in which the Workstation 106 was inactive ("inactive time") and stores this calculation and other information in the Downtime.Log 308 file.

The Avail On/Off Unit 306 calculates the inactive time by retrieving the current time from the operating system 203 and the stored time from the Switch.Log 304 file and subtracting the latter from the former. The inactive time and other related information is then stored in the Downtime.Log 308 file.

Figures 6, 7:
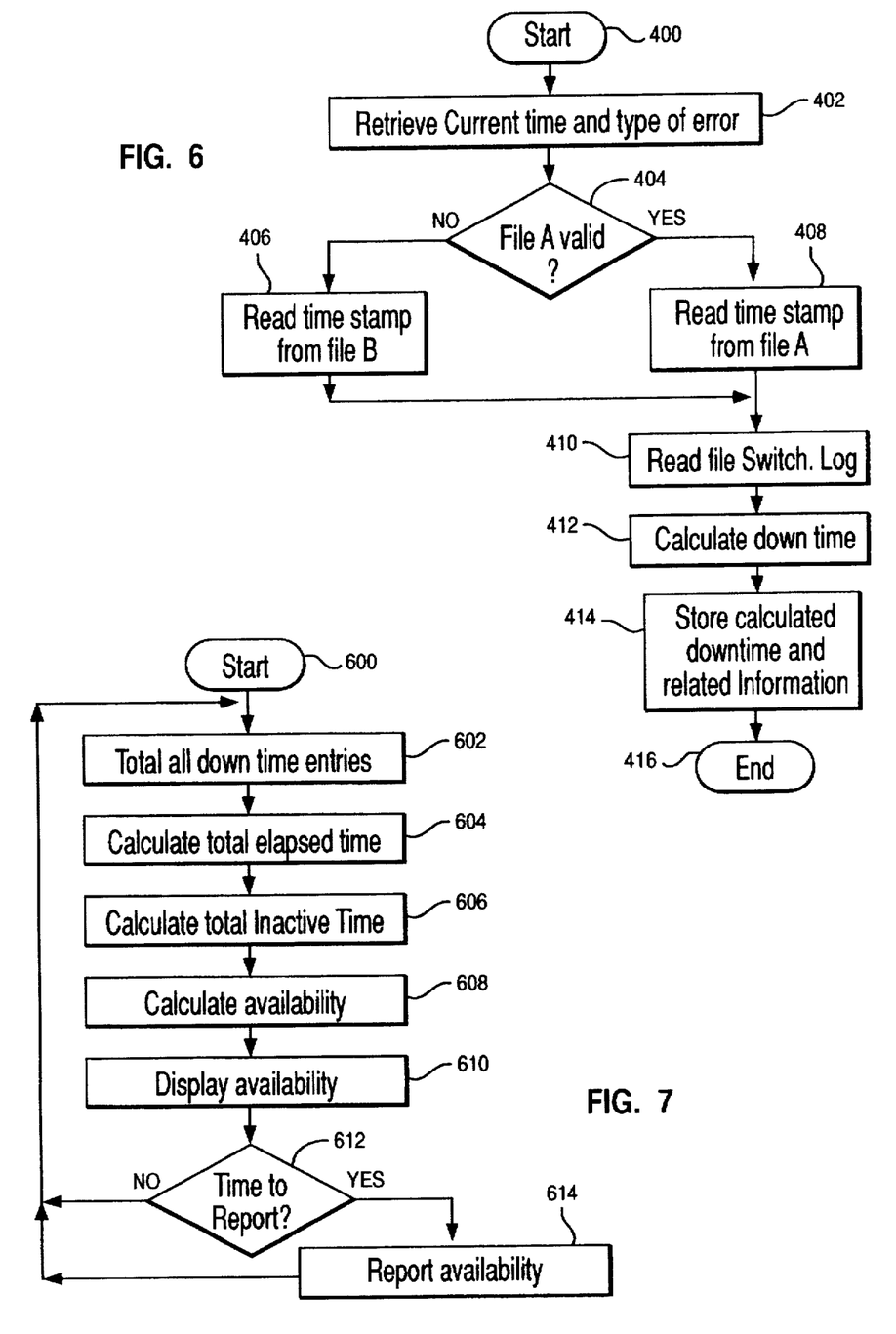
FIG. 6 is a flow chart illustrating the steps comprising the execution of the Downtime unit 310 of FIG. 4 according to the preferred embodiment of the present invention.
FIG. 7 is a flow chart illustrating the parsing of the Downtime.Log 308 by the availability unit 312 of FIG. 4 according to the preferred embodiment of the present invention.

The Downtime unit 310 is only invoked upon reboot of the Workstation 106. Reference now being made to FIG. 6, a flow chart is shown illustrating the steps comprising the execution of the Downtime unit 310 of FIG. 4 according to the preferred embodiment of the present invention. The execution of the Downtime unit 310 begins at step 400 upon the reboot of the Workstation 106 and proceeds to step 402. At step 402, the Downtime unit 310 queries the operating system 203 for the current time, and the type of error, if any, which caused the Workstation 106 to become unavailable. Thereafter, the execution proceeds to step 404 where the Downtime unit 310 determines which one of the files TimeStamp.LogA 206 or Timestamp.LogB 208 is valid. If it is determined, at step 404, that Timestamp.LogA 206 is valid, then the execution proceeds to step 408 where the stored timestamp entry is read from TimeStamp.LogA 206. Thereafter, the execution proceeds to step 410.

If, however, at step 404, it is determined that Timestamp.LogA 206 is invalid, then the execution proceeds to step 406 where the timestamp entry stored in TimeStamp.LogB 208 is read. Thereafter, the execution proceeds to step 410. It should be noted, that either of the timestamp entries stored in files Timestamp.LogA 206 or Timestamp.LogB 208 will coincide within the arbitrary time period of when the work station 106 became unavailable. This results from the fact that no information (time) can be logged into either of the Timestamp.LogA 206 or Timestamp.LogB 208 files when the Workstation 106 is unavailable.

At step 410, the Downtime unit 310 reads the entry in the Switch.Log 304 file to determine whether the downtime was scheduled or unscheduled. If the entry in 304 contains a timestamp, then the down time was scheduled. If the entry does not contain a valid timestamp, then the down time was unscheduled. Thereafter, the execution proceeds to step 412 where the period of time for which the work station 106 was unavailable is calculated by subtracting the retrieved timestamp from the current time. The execution then proceeds to step 414 where the Downtime unit 310 stores whether or not the calculated unavailability of the work station 106 was scheduled/unscheduled/inactive, the date, the calculated duration of the unavailability, whether the unavailability was the result of a hardware, software, or other type of error, and errorId. Thereafter, the execution proceeds to end at step 416.

The Availability Unit 312 parses the Downtime.Log 308 file and provides unavailability information pertaining to the Workstation 106 to the user and/or the server 102. Reference now being made to FIG. 7, a flow chart is shown illustrating the parsing of the Downtime.Log 308 by the availability unit 312 of FIG. 4 according to the preferred embodiment of the present invention. The parsing begins at step 600 upon the execution of the availability unit 312 and proceeds to step 602. At step 602, all of the type unscheduled entries 308b–n are summed together to produce a total down time. Thereafter, the parsing proceeds to step 604 where the total elapsed time is calculated by taking the difference between the current time and the start time stored in the header entry 308a. The parsing then proceeds to step 606 where the total inactive time is calculated by summing together all of the type inactive entries 308b–n. The execution then proceeds to step 608 where the availability of the Workstation 106 is calculated. This is accomplished using the following formula:

$$\text{Availability} = 1 - (\text{unscheduled down time}/(\text{total elapsed time} - \text{total inactive time}))$$

The availability of the Workstation 106 is then displayed on a display device associated with the Workstation 106 at step 610, and the execution proceeds to step 612. At step 612, the availability unit 312 determines whether a user specified time period has elapsed for reporting the availability of the Workstation to a central directory, such as server 102 (FIG. 1). If it is determined, at step 612, that it is time to report the availability, then the process proceeds to step 614 where the availability of the Workstation 106 is reported to the server 102. The server 102 can collect availability information for all of the Workstations 106–106n and calculate various statistics. These statistics can be provided to each of the Workstations 106–106n to inform them as to their availability as compared to other Workstations of the system 100.

If, however, at step 612, it is determined that it is not time to report the availability of the Workstation 106 to the server 102, then the process proceeds to step 602 and repeats the parsing enumerated above from that reference designation.

DETAILED EXAMPLE

Figure 8:
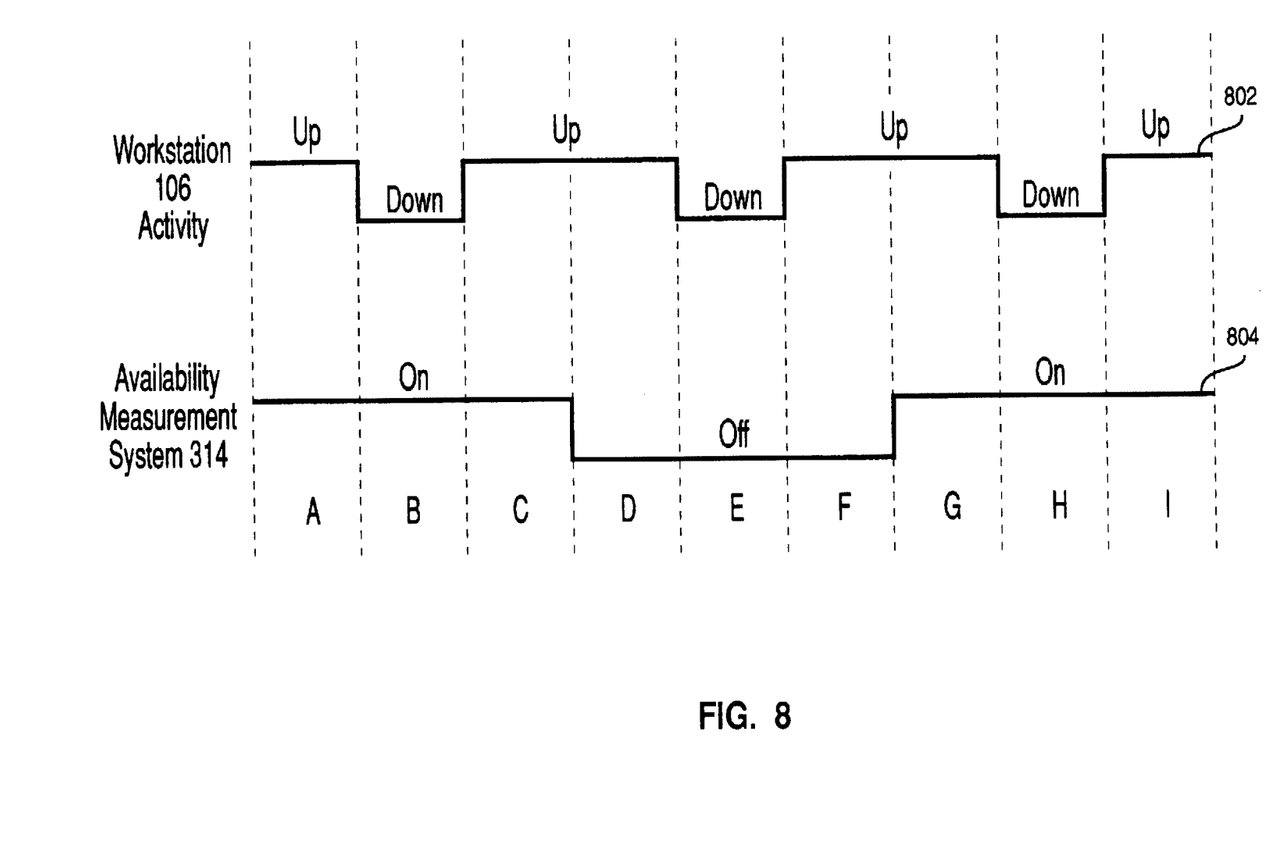
FIG. 8 is a timing diagram illustrating an example of a time period in which the availability for the Workstation 106 of FIG. 1 is measured according to the teachings of the present invention.

Reference now being made to FIG. 8, a timing diagram is shown illustrating an example of a time period in which the availability for the Workstation 106 of FIG. 1 is measured according to the teachings of the present invention. In FIG. 8, the flow of time is shown as proceeding from left to right, and is divided into nine consecutive periods designated as A–I. The activity of the Workstation 106 has been illustrated by time line 802, and the status of the Availability Measurement System 310 has been illustrated as time line 804. As can be seen from FIG. 8, work station 106 is operational for time periods A, C–D, F–G, and I, and the Availability Measurement System 310 was active from time periods A–C and G–I.

In this example, the following can be assumed:
(1) that two time stamp log files have been created for the Workstation 106, and will be referred to hereinafter as TimeStamp.LogA 206 and TimeStamp.LogB 208, respectively; and
(2) that an Availability Measurement System 314, and a DownTime.Log 208 have also been created for the Workstation 106 as previously described in connection with FIG. 4.

With continuing reference to FIG. 8, at time period A it is noted that Workstation 106 is available and the Availability Measurement System 314 is active. As previously explained in connection with FIG. 4, a time stamp is recorded continuously in files TimeStamp.LogA 206 and TimeStamp.LogB 208 until some type of event occurs that causes Workstation 106 to become unavailable.

At time period B, such an unavailability event occurs for Workstation 106, and all recording of timestamp entries in files TimeStamp.LogA 206 and TimeStamp.LogB 206 cease to occur. At time period C, Workstation 106 once again becomes available, and the Downtime Unit 310 is executed. The execution of the Downtime Unit 310 is explained in detail in connection with FIG. 6, however, a brief explanation is provided hereafter to better enable the comprehension of the present example.

Upon execution, the Downtime Unit 310 proceeds to retrieve the current time and the type of error, which caused the unavailability from the operating system 203 (steps 400–402). Thereafter, the Downtime Unit 310 reads the recorded timestamp from either TimeStamp.LogA 206 or TimeStamp.LogB 208, depending on which is valid, to determine the time period in which Workstation 106 was last available (steps 404–408). The Downtime Unit 310 then reads the file Switch.Log 304 to determine whether the unavailability was scheduled (step 410). In this example, it was not scheduled. The Downtime Unit 310 then proceeds to calculate the total down time for Workstation 106 (step 412), and store the downtime and the fact that the unavailability was unscheduled in the file DownTime.Log 308 (step 414). In this instance, time period B is equal to the total time in which Workstation 106 was unavailable. In this example, it can also be assumed that this value is stored in Downtime.Log 308 entry 308b.

At time period D, the user of Workstation 106 invokes the Avail On/Off Unit 306 to turn off (disable) the Availability Measurement System 314 as previously described in connection with FIG. 4. Consequently, a time stamp representing the initiation of the disablement is recorded in file Switch.Log 304. It should also be noted that Workstation 106 continues to be available during time period D.

At time period E, the Workstation 106 becomes unavailable and all recording of timestamp entries in files TimeStamp.LogA 206 and TimeStamp.LogB 206 cease to occur. At time period E the unavailability of the Workstation 106 continues. At time period F the Workstation 106 once again becomes available, and the Downtime Unit 310 is executed.

Upon execution, the Downtime Unit 310 proceeds to retrieve the current time and the type of error, which caused the unavailability from the operating system 203 (steps 400–402). Thereafter, the Downtime Unit 310 reads the recorded timestamp from either TimeStamp.LogA 206 or TimeStamp.LogB 208, depending on which is valid, to determine the time period in which Workstation 106 was last available (steps 404–408). The Downtime Unit 310 then reads the file Switch.Log 304 to determine whether the unavailability was scheduled (step 410). In this example, the unavailability was scheduled. The Downtime Unit 310 then proceeds to calculate the total down time for Workstation 106 (step 412), and store the calculated downtime and the fact: that the unavailability was scheduled in the file DownTime.Log 308 (step 414). In this instance, time period E is equal to the total time in which Workstation 106 was unavailable. In this example, it can also be assumed that this value is stored in Downtime.Log 308 entry 308c. At time period F, the Workstation 106 becomes available At time period G, the Availability Measurement System 314 is turned back on, and the Workstation 106 continues to be available. However, at time period H the Workstation 106 becomes unavailable and all recording of timestamp entries in files TimeStamp.LogA 206 and TimeStamp.LogB 208 cease to occur. At time period I the Workstation 106 once again becomes available, and the Downtime Unit 310 is executed.

Upon execution, the Downtime Unit 310 proceeds to retrieve the curren time and the type of error, which caused the unavailability from the operating system 203 (steps 400–402). Thereafter, the Downtime Unit 310 reads the recorded timestamp from either TimeStamp.LogA 206 or TimeStamp.LogB 208, depending on which is valid, to determine the time period in which Workstation 106 was last available (steps 404–408). The Downtime Unit 310 then reads the file Switch.Log 304 to determine whether the unavailability was scheduled (step 410). In this example, it was not scheduled. The Downtime Unit 301 then proceeds to calculate the total down time for Workstation 106 (step 412), and store the downtime and the fact that the unavailability was unscheduled in the file DownTime.Log 308 (step 414). In this instance, time period H is equal to the total time in which Workstation 106 was unavailable. In this example, it can also be assumed that this value is stored in Downtime.Log 308 entry 308d. At time period I, the Workstation continues to be available.

In this example, it is assumed that the availability of Workstation 106 is desired to be calculated from time period A to time period I. Consequently, by reading the entries 308b–d from the file Downtime.Log 308 the calculation would result as follows:

Total Unscheduled Downtime=B+H;

Total Scheduled Downtime=E;

Total Inactive Time=D+E+F;

Total Elapsed Time=A+B+C+D+E+F+G+H+I;

Availability=1−((B+H)/(A+B+C+G+H+I));

Arbitrarily assigning a value of 20 to each time period B, E, and H, and a value of 10 to A, C, D, F, G, and I. The calculation of availability would be 1−(40/80)=0.50 or 50 percent.

It is thus believed that the operation and construction of the present invention will be apparent from the foregoing description. While the method and system shown and described has been characterized as being preferred, it will be readily apparent that various changes and/or modifications could be made therein without departing from the spirit and scope of the present invention as defined in the following claims.

What is claim is:

1. A method of determining the availability of a workstation in a distributed network, the method comprising the steps of:

creating, for the workstation, a heartbeat monitor for storing, at predetermined time intervals, the current time of the network;

retrieving, in response to the workstation transitioning from being unavailable to available, the current time of the network and the stored time;

calculating the total duration for which the workstation was unavailable using the retrieved time and the stored time;

storing the calculated duration; and calculating the availability of the workstation for a defined period of time using the stored durations.

2. The method of claim 1 wherein said step of storing the duration of each interval includes the step of:

storing an indication as to the cause of the unavailability of said workstation for each duration of time.

3. The method of claim 2 wherein said step of calculating the availability of said workstation includes the step of:

calculating the availability of said workstation for a defined period of time using selected members of said stored durations.

4. The method of claim 3 wherein said selected members are selected based upon unscheduled unavailability times for said workstation.

5. The method of claim 4 wherein a server of said network assigns a job to said workstation based upon said calculated availability.

6. An apparatus for determining the availability of a workstation in a distributed network, the apparatus comprising:

means for creating, for the workstation, a heartbeat monitor for storing, at predetermined time intervals, the current time of the network;

means for retrieving, in response to the workstation transitioning from being unavailable to available, the current time of the network and the stored time;

means for calculating the total duration for which the workstation was unavailable using the retrieved time and the stored time;

means for storing the calculated duration; and means for calculating the availability of the workstation for a defined period of time using the stored durations.

7. The apparatus of claim 6 wherein said means for storing the duration of each interval includes:

means for storing an indication as to the cause of the unavailability of said workstation for each duration of time.

8. The apparatus of claim 7 wherein said means for calculating the availability of said workstation includes:

means for calculating the availability of said workstation for a defined period of time using selected members of said stored durations.

9. The apparatus of claim 8 wherein said selected members are selected based upon unscheduled unavailability times for said workstation.

10. The apparatus of claim 9 wherein a server of said network assigns a job to said workstation based upon said calculated availability.

11. A computer program product, comprising:

a computer usable medium having computer readable program code means embodied in the medium for determining the availability of a workstation in a distributed network, the computer readable program code means including:

means for creating, for the workstation, a heartbeat monitor for storing, at predetermined time intervals, the current time of the network;

means for retrieving, in response to the workstation transitioning from being unavailable to available, the current time of the network and the stored time;

means for calculating the total duration for which the workstation was unavailable using the retrieved time and the stored time;

means for storing the calculated duration; and means for calculating the availability of the workstation for a defined period of time using the stored durations.

12. The computer program product of claim 4 wherein said means for storing the duration of each interval includes:

means for storing an indication as to the cause of the unavailability of said workstation for each duration of time.

13. The computer program product of claim 12 wherein said means for calculating the availability of said workstation includes:

means for calculating the availability of said workstation for a defined period of time using selected members of said stored durations.

14. The computer program product of claim 13 wherein said selected members are selected based upon unscheduled unavailability times for said workstation.

15. The computer program product of claim 14 wherein a server of said network assigns a job to said workstation based upon said calculated availability.

* * * * *